(12) United States Patent
Uramichi et al.

(10) Patent No.: US 7,100,986 B2
(45) Date of Patent: Sep. 5, 2006

(54) SEAT RECLINING MECHANISMS

(75) Inventors: Hideki Uramichi, Toyota (JP);
Takayuki Endo, Okazaki (JP)

(73) Assignee: Arakawa Shatai Kogyo Kabushiki Kaisha, Aishi-ken (JP)

( * ) Notice: Subject to any disclaimer, the term of this patent is extended or adjusted under 35 U.S.C. 154(b) by 0 days.

(21) Appl. No.: 10/730,693

(22) Filed: Dec. 8, 2003

(65) Prior Publication Data

US 2004/0113475 A1    Jun. 17, 2004

(30) Foreign Application Priority Data

Dec. 10, 2002    (JP)    ............................. 2002-358341

(51) Int. Cl.
*B60N 2/02*    (2006.01)
(52) U.S. Cl. .................................................... 297/366
(58) Field of Classification Search ................ 297/366, 297/367, 373; 16/221, 235, 354
See application file for complete search history.

(56) References Cited

U.S. PATENT DOCUMENTS

| 5,779,313 | A | 7/1998 | Rohee | |
| 6,092,874 | A * | 7/2000 | Kojima et al. | 297/367 |
| 6,439,663 | B1 * | 8/2002 | Ikegaya | 297/367 |
| 6,554,361 | B1 * | 4/2003 | Reubeuze et al. | 297/367 |
| 6,669,297 | B1 * | 12/2003 | Cilliere et al. | 297/367 |
| 6,715,835 | B1 * | 4/2004 | Hoshihara et al. | 297/366 |
| 2004/0036337 | A1 * | 2/2004 | Hoshihara et al. | 297/367 |

FOREIGN PATENT DOCUMENTS

JP    2002-010851    1/2002

* cited by examiner

*Primary Examiner*—Milton Nelson, Jr.
(74) *Attorney, Agent, or Firm*—Patterson, Thuente, Skaar & Christensen, P.A.

(57) ABSTRACT

Seat reclining mechanisms for a vehicle seat may include a first or stationary housing, a second or rotational housing, a locking means received between the first and second housings, and a fastener for rotatably connecting the second housing to the first housing. The fastener is formed with at least one retainer portion and at least one slide portion that respectively project toward the second housing. Preferably, the at least one slide portion has a height greater than the at least one retainer portion.

5 Claims, 9 Drawing Sheets

1

SEAT RECLINING MECHANISMS

This application claims priority to Japanese Patent Application Serial Number 2002-358341, the contents of which are incorporated herein by reference.

BACKGROUND OF THE INVENTION

1. Field of the Invention Deferent

The present invention relates to seat reclining mechanisms for adjusting a tilt angle of a seat back of a seat (e.g., a vehicle seat).

2. Description of the Related Art

Typically, a vehicle seat comprises a seat back and a seat cushion. The seat back and the seat cushion are rotatably interconnected via a seat reclining mechanism for adjusting a tilt angle of the seat back. Such a seat reclining mechanism is taught, for example, by Japanese Laid-Open Patent Publication Number 2002-10851. Such a seat reclining mechanism is known as a "round type" seat reclining mechanism.

As shown in FIG. 11, the known seat reclining mechanism includes a pair of opposing disk-like housings, i.e., a first or stationary housing 11 and a second or rotational housing 12. The first housing 11 is affixed to the vehicle seat cushion (not shown). The second housing 12 is affixed to the vehicle seat back (not shown). The first and second housings 11 and 12 are circumferentially connected by an annular fastener or clip ring 2 along peripheral edges 11a and 12a thereof, so that the second housing 12 can move or rotate relative to the first housing 11 around a rotational shaft (not shown).

The clip ring 2 comprises an annular guide portion 2a that slidably support the peripheral edge 12a of the second housing 12 and an annular fixture portion 2b that is fixed to the peripheral edge 11a of the first housing 11. The guide portion 2a is circumferentially formed with a plurality of projections or slide portions 2a-1, so that a sliding clearance between the second housing peripheral edge 12a and the clip ring guide portion 2a can be easily controlled. As shown in FIG. 10, the slide portions 2a-1 are spaced at equal intervals. The first and second housing 11 and 12 thus assembled are respectively fixed to the seat cushion and the seat back.

The seat reclining mechanism further includes a locking means (not shown) that can prevent the second housing 12 from rotating relative to the first housing 11, so as to lock the seat reclining mechanism. The locking means essentially consists of a cam member and a pair of pawls (not shown) that are received within the housings 11 and 12. The cam member is secured to or integrally formed with the rotational shaft, so as to rotate with the rotational shaft. Each of the pawls is provided with a convex toothed portion and is radially movably positioned on the first housing 11.

When the rotational shaft is rotated to a locking position, the pawls are radially moved outward by the cam member, so that the respective convex toothed portions of the pawls engage a concave toothed portion (not shown) that is circumferentially formed over an inner circular surface of the second housing peripheral edge 12a. In this state, the second housing 12 is prevented from rotating relative to the first housing 11, so that the seat reclining mechanism is locked. As a result, the seat back is locked in position relative to the seat cushion.

Often times, a large force can be unexpectedly applied to the seat reclining mechanism in a direction to separate the housings 11 and 12 from each other. Such a large force may concentrate to the slide portions 2a-1 of the clip ring guide portion 2a. As a result, the guide portion 2a may be deformed outwardly or spread out, as shown by a broken line in FIG. 11. Such a deformation of the guide portion 2a may reduce a locking performance of the seat reclining mechanism.

SUMMARY OF THE INVENTION

It is, accordingly, one object of the present teachings to provide improved seat reclining mechanisms.

For example, in one aspect of the present teachings, a seat reclining mechanism for a vehicle seat may include a first or stationary housing, a second or rotational housing, a locking means received between the first and second housings, and a fastener for rotatably connecting the second housing to the first housing. The fastener is formed with at least one retainer portion and at least one slide portion that respectively project toward the second housing. Preferably, the at least one slide portion has a height greater than the at least one retainer portion.

Thus, when a large force is applied to the seat reclining mechanism in a direction to separate the first and second housings from each other, the retainer portion may receive and resist such a large force, so that the fastener can be effectively prevented from outwardly deforming. As a result, a desired locking performance of the seat reclining mechanism can be reliably maintained even if the seat reclining mechanism is acted upon by such a large force.

Other objects, features and advantages of the present invention will be readily understood after reading the following detailed description together with the accompanying drawings and the claims.

DETAILED DESCRIPTION OF THE INVENTION

Representative examples of the present invention have been described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present teachings.

Detailed representative embodiments of the present teachings are shown in FIG. 1 to FIG. 9.

FIRST DETAILED REPRESENTATIVE EMBODIMENT

A first detailed representative embodiment of the present teachings is shown in FIGS. 1 to 6.

Figure 1:
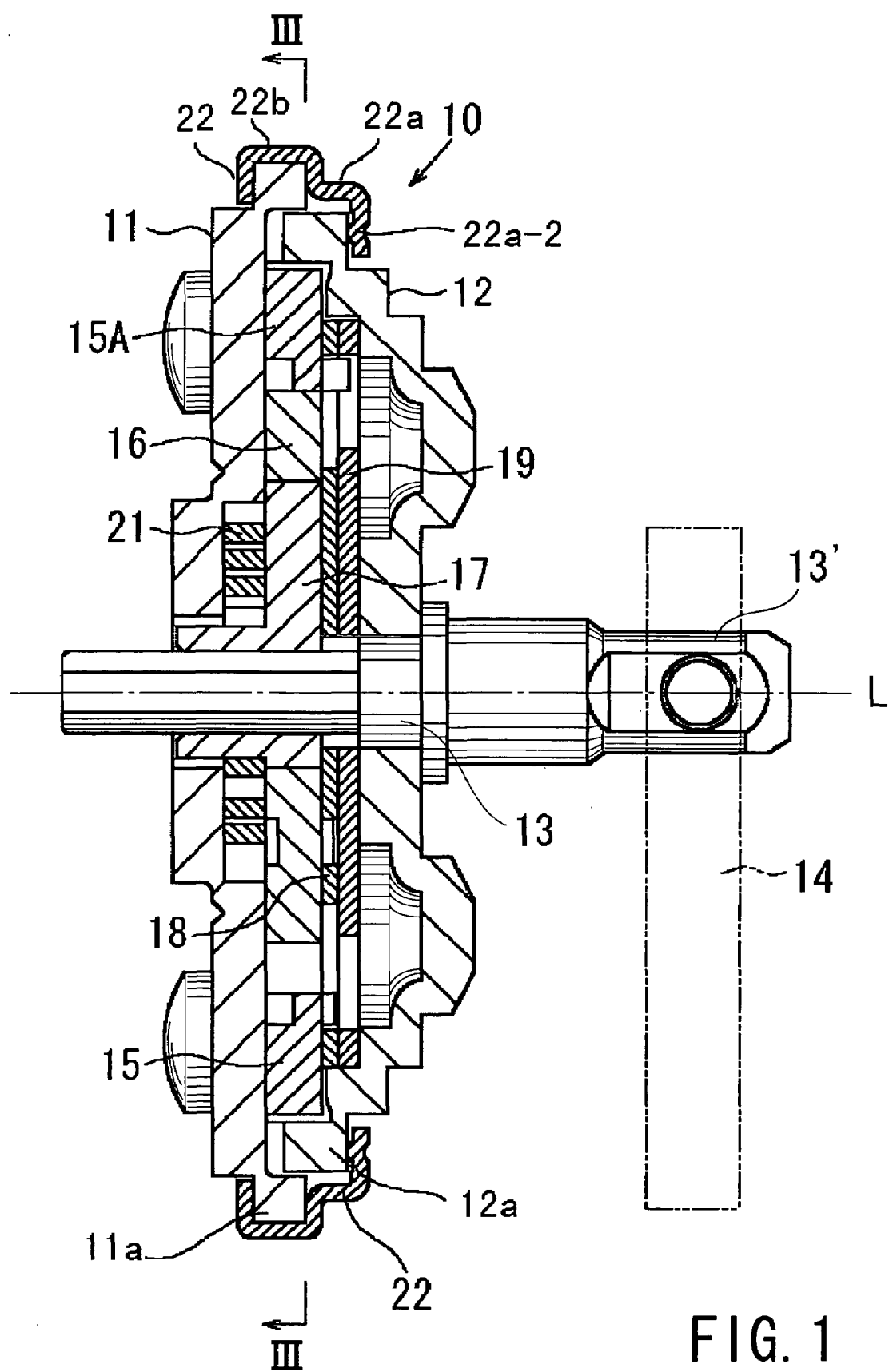
FIG. 1 is a vertical, cross-sectional view of a seat reclining mechanism according to a first embodiment of the present teachings.
Figure 2:
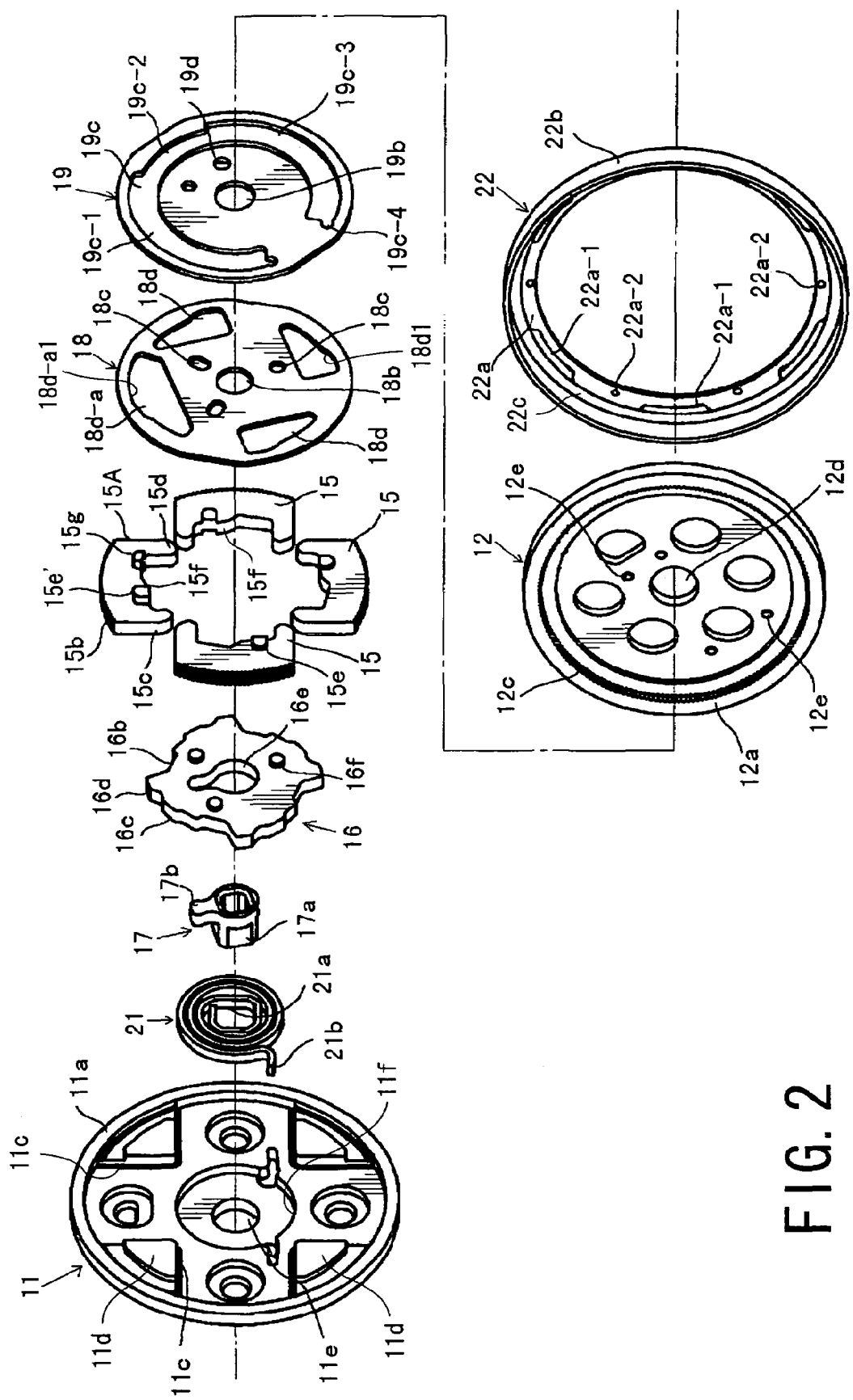
FIG. 2 is an exploded perspective view of the seat reclining mechanism.
Figure 3:
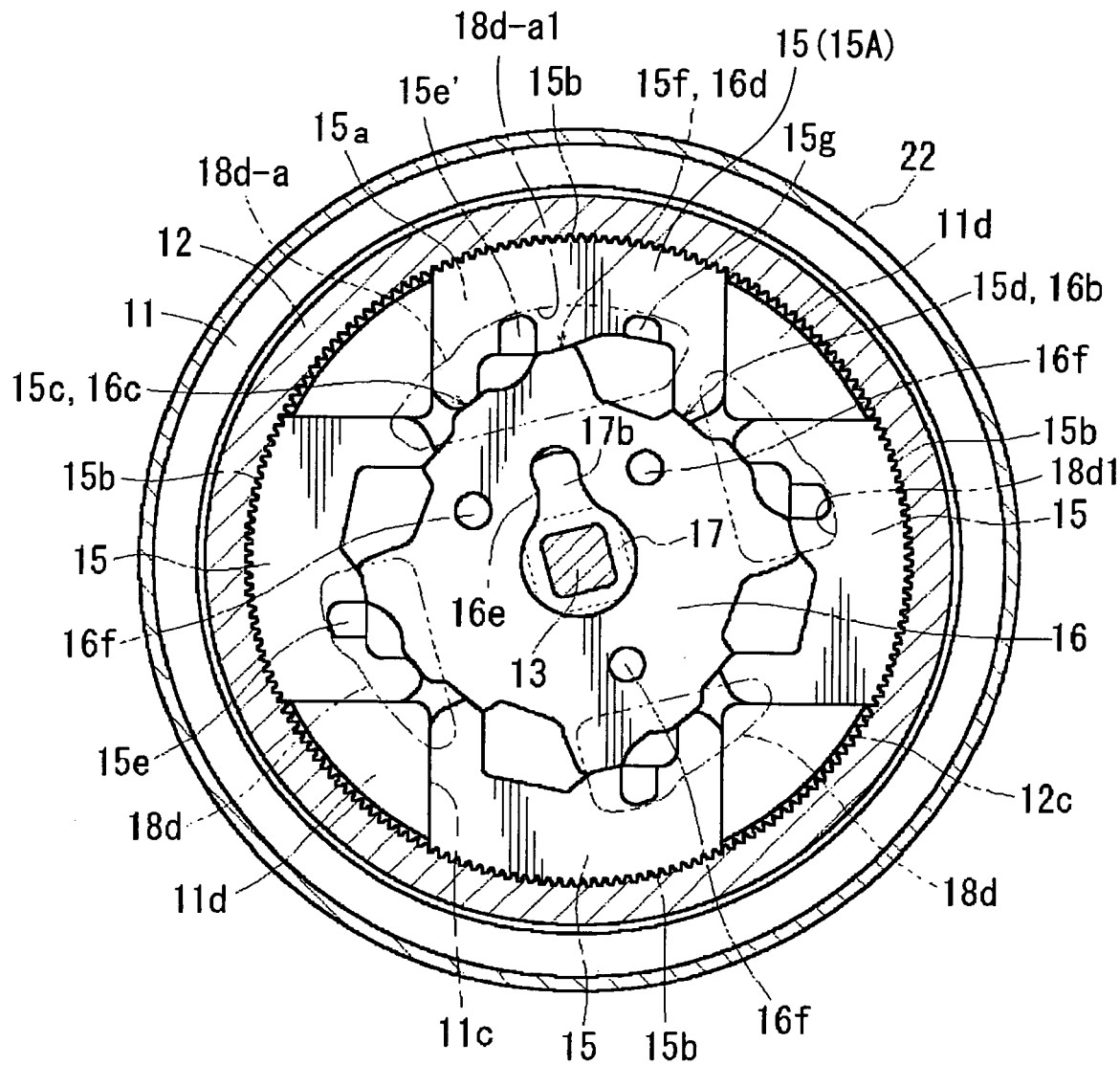
FIG. 3 is a cross-sectional view taken along line III—III in FIG. 1, which illustrates a locking position of a rotational shaft of the seat reclining mechanism.

As shown in FIGS. 1 to 3, a representative seat reclining mechanism 10 for adjusting a tilt angle of a seat back of a vehicle seat (not shown) is designed to be disposed on one side of the vehicle seat. The seat reclining mechanism 10 includes a pair of opposing dish-like housings, i.e., a first or stationary housing 11 and a second or rotational housing 12. The first housing 11 is affixed to a vehicle seat cushion (not shown). The second housing 12 is affixed to the vehicle seat back. The first and second housings 11 and 12 are circumferentially connected by an annular fastener or clip ring 22 along oppositely projected peripheral edges 11a and 12a thereof, so that the second housing 12 can move or rotate relative to the first housing 11 around a rotational axis L. Further, the rotational axis L corresponds to a common centerline of the first and second housings 11 and 12.

The seat reclining mechanism 10 also includes a square rotational rod or shaft 13 that extends along the rotational axis L through the seat cushion and the seat back as well as the first and second housings 11 and 12. The rotational shaft 13 includes an extended portion (manipulating portion) 13', which is typically connected to a seat operation handle or lever 14.

The seat reclining mechanism 10 further includes a locking means or rotation controlling means that can prevent the second housing 12 from rotating relative to the first housing 11, so as to lock the seat reclining mechanism 10. As best shown in FIG. 2, the locking means preferably consists of four slide pawls (i.e., locking members) 15, a rotary cam 16, an operation arm 17, an active plate 18, an unlocking plate 19 and a biasing (spiral) spring 21 that are received within the housings 11 and 12. As shown in FIGS. 1 and 3, the operation arm 17 is secured to the rotational shaft 13, so as to rotate with the rotational shaft 13.

As shown in FIGS. 2 and 3, the first housing 11 is formed with two pairs of opposite triangular thickened portions 11d that are positioned at equal intervals along the peripheral edge 11a, so that four guide grooves 11c are defined therebetween. As will be apparent, the guide grooves 11c may intersect crosswise and radially extend on the first housing 11. In addition, the first housing 11 is formed with a central circular bore 11e, which rotatably receives the rotational shaft 13. Furthermore, the first housing 11 has an inner annular groove 11f that is formed around the central bore 11e.

As shown in FIGS. 2 and 3, the second housing 12 includes a circular concave toothed portions 12c that is circumferentially formed along an inner surface of the peripheral edge 12a. In addition, the second housing 12 is formed with a central circular bore 12d, which is aligned with the central bore 11e and rotatably receives the rotational shaft 13. Moreover, the second housing 12 is formed with four inner engagement projections 12e, which are appropriately arranged around the central bore 12d.

As shown in FIGS. 2 and 3, all of the slide pawls 15 have substantially the same shape and construction. However, one of the slide pawls 15 (which will be referred to as a special slide pawl 15A) has a special construction different from the other three slide pawls 15 (which will be referred to as normal slide pawls 15), so as to have a special function (which will be hereinafter described). The slide pawls 15 (and 15A) are closely slidably received within the guide grooves 11c of the first housing 11, so as to radially move on the first housing 11. As will be recognized, because the slide pawls 15 (and 15A) are received in the guide grooves 11c, the pawls 15 (and 15A) may preferably be prevented from rotating relative to the first housing 11.

Each of the slide pawls 15 (and 15A) has an outwardly curved outer surface and a specially shaped inner surface. The curved outer surface of each pawl 15 (and 15A) is provided with a corresponding convex toothed portion 15b for releasably engaging the concave toothed portion 12c of the second housing 12. Also, the inner surface of each slide pawl 15 (and 15A) is provided with a pair of leg portions or cam contacts (first and second) 15c and 15d that extend in parallel along each of the guide grooves 11c. In addition, the inner surface of each pawl 15 (and 15A) is provided with an additional or central cam contact (third) 15f.

Each of the normal slide pawls 15 has a substantially square cam projection 15e that projects toward the second housing 12. The cam projection 15e is disposed along the inner surface of the slide pawl 15. The special slide pawl 15A also has a substantially square cam projection 15e' similar to the cam projection 15e of the slide pawl 15. However, the cam projection 15e' is different from the cam projection 15e in that the cam projection 15e' is longer than the cam projection 15e. The special slide pawl 15A also has an additional cam projection 15g that projects in parallel with the cam projection 15e'. The additional cam projection 15g also is disposed along the inner surface of the slide pawl 15A and has substantially the same length as the longer cam projection 15e'. The cam projection 15e' of the special slide pawl 15A may perform the same function as the cam projection 15e as well as an additional function (which will be hereinafter described).

As shown in FIGS. 2 and 3, the rotary cam 16 is a specially contoured plate-like member. The rotary cam 16 is received in a space defined by the inner surfaces of the slide pawls 15 (and 15A), so as to be rotatable around the rotational axis L over a desired angle. The rotary cam 16 has four sets of three cam portions (first to third), 16c, 16b, and 16d, that are formed in a circumferential end surface thereof. The first cam portions 16c of the respective sets are positioned at equal intervals along the circumferential end surface. Similarly, the second and third cam portions 16b and 16d of the respective sets also are positioned at equal intervals along the circumferential end surface, respectively. As best shown in FIG. 3, the first to third cam portions 16c, 16b, and 16d, of each set are respectively arranged and constructed to contact the first to third cam contacts 15c, 15d, and 15f, of each pawl 15 (and 15A), so that the slide pawls 15 (and 15A) can be moved outwardly along the guide grooves 11c when the rotary cam 16 is rotated to a locking position (FIG. 3). That is, the rotary cam 16 may function as a cam mechanism for outwardly moving the slide pawls 15 (and 15A) when it is rotated to the locking position.

In addition, the rotary cam 16 is formed with a noncircular central bore 16e. Further, the rotary cam 16 has three engagement projections 16f that are positioned around the central bore 16e at desired intervals and project toward the second housing 12.

The operation arm 17 comprises a square tubular connecting portion 17a and a noncircular arm portion 17b. The arm portion 17b is integrally formed with the connecting portion 17a and has an outer profile that substantially corresponds to an inner profile of the rotary cam central bore 16e. As shown in FIG. 3, the connecting portion 17a has a rectangular through bore that corresponds to an outer profile of the rotational shaft 13. The connecting portion 17a is journaled on the rotational shaft 13, so that the operation arm 17 (the arm portion 17b) can rotate with the rotational shaft 13. As will be appreciated, the operation arm 17 is appropriately positioned on the shaft 13, so that the arm portion 17b unrotatably engages the rotary cam central bore 16e.

As shown in FIG. 2, the active plate 18 is a substantially circular plate-like member and is positioned adjacent to the slide pawls 15 (and 15A). The active plate 18 is formed with a circular central bore 18b, which is aligned with the central bores 11e and 12d, of the housings 11 and 12, and rotatably receives the rotational shaft 13. Also, the active plate 18 has three small engagement apertures 18c, which are positioned around the central bore 18b at desired intervals. As will be appreciated, the engagement apertures 18c respectively receive the engagement projections 16f of the rotary cam 16, so that the active plate 18 can be rotated with the rotary cam 16 as a unit. In addition, the active plate 18 further includes three window-like normal cam slots 18d and a window-like special cam slot 18d-a that are formed along a periphery thereof at equal intervals. Each of the normal cam slots 18d has an arcuate normal cam contact surface 18d1. Similarly, the special cam slot 18d-a has an arcuate special cam contact surface 18d-a1, which is partially identical with the normal cam surface 18d1. As will be recognized, the normal cam grooves 18d respectively receives the cam projections 15e of the slide pawl 15. Also, the special cam groove 18d-a receives both of the cam projections 15e' and 15g of the special slide pawl 15A. As a result, the active plate 18 may function as a cam mechanism for inwardly moving the slide pawls 15 (and 15A) when the rotary cam 16 is rotated clockwise in FIG. 3.

As shown in FIG. 2, the unlocking plate 19 is a substantially circular plate-like member and is positioned adjacent to the active plate 18. The unlocking plate 19 is formed with a circular central bore 19b, which is aligned with the active plate central bore 18b and rotatably receives the rotational shaft 13. Also, the unlocking plate 19 has two small engagement apertures 19d, which are positioned around the central bore 19b. In addition, the unlocking plate 19 further includes a substantially annular or horseshoe-shaped cam slot 19c extending along a periphery thereof. The cam slot 19c includes a pair of (first and second) symmetrical wide sections 19c-1 and 19c-3, and a narrow mid section 19c-2. Each of the first and second wide sections 19c-1 and 19c-3 is formed with an end engagement portion 19c-4. As will be recognized, the engagement apertures 19d and the end engagement portions 19c-4 respectively engage the inner engagement projections 12e of the second housing 12, so that the unlocking plate 19 can be rotated with the second housing 12 as a unit.

The first wide section 19c-1 has substantially the same shape and size as the second wide section 19c-3. That is, the first wide section 19c-1 includes a cam surface that has the same radius of curvature as that of the third wide section 19c-3. However, the mid section 19c-2 includes a cam surface that has a smaller radius of curvature than that of the wide section 19c-1 or 19c-3. The cam slot 19c thus shaped receives the cam projections 15e' and 15g of the special slide pawl 15A. As will be recognized, the cam slot 19c does not receives the cam projections 15e of the normal slide pawl 15, because the cam projections 15e terminate in the active plate cam slots 18d and do not extend to the unlocking plate 19. As a result, the unlocking plate 19 may function as a cam mechanism for inwardly moving only the special slide pawl 15A.

It should be noted that the unlocking plate 19 is preferably positioned such that the cam projections 15e' and 15g of the slide pawl 15A are received in the first wide section 19c-1 of the cam slot 19c, so as to contact the cam surface of the first wide section 19c-1 when the rotary cam 16 is in the locking position (FIG. 3). In addition, the unlocking plate 19 also is preferably positioned such that the cam projection 15g of the slide pawl 15A is disposed adjacent to the beginning of the mid section 19c-2 of the cam slot 19c.

The biasing (spiral) spring 21 is disposed within the annular groove 11f of the first housing 11. The spiral spring 21 includes an inner end portion 21a that is coiled in rectangles and an outer end portion 21b that is simply outwardly folded. The inner end portion 21a unrotatably receives the square connecting portion 17a of the operation arm 17. The outer end portion 21b is appropriately secured in the first housing annular groove 1 If, so that the biasing spring 21 is not rotated therein. As will be recognized, the spiral spring 21 thus arranged and constructed may preferably urge (bias) the operation arm 17 (and the rotational shaft 13) to a desired rotational direction (i.e., counterclockwise in FIG. 3), so that the rotational shaft 13 can be normally retained in a locking position (FIG. 3).

Figure 4:
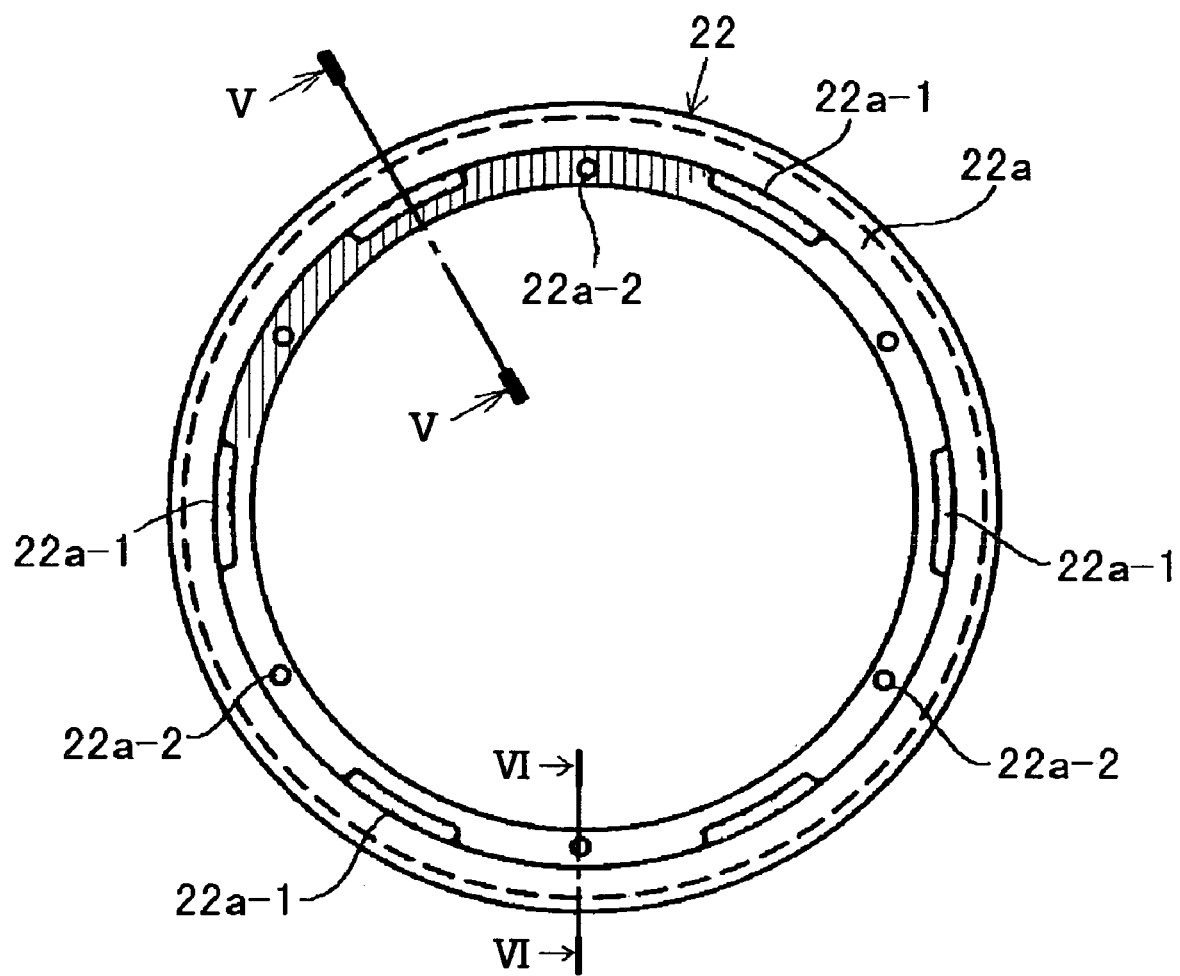
FIG. 4 is a plan view of a clip ring, in which first and second housings are omitted.
Figure 5:
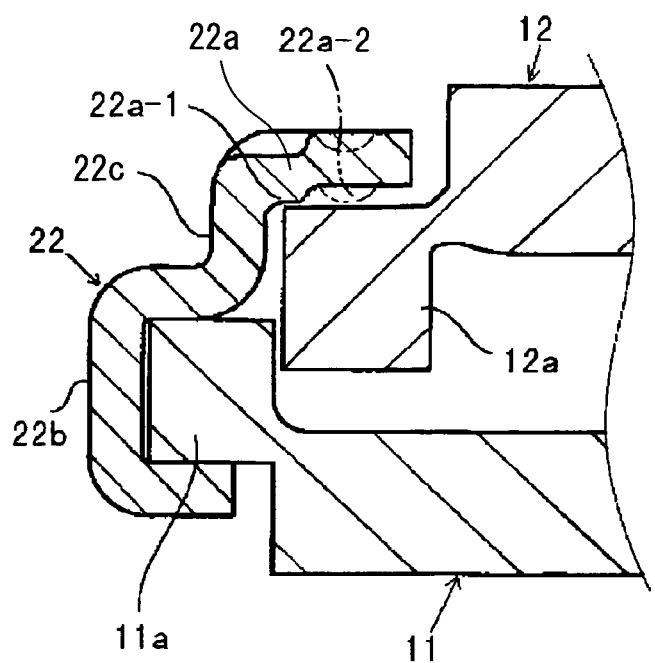
FIG. 5 is a cross-sectional view taken along line V—V in FIG. 4, in which the first and second housings are shown.
Figure 6:
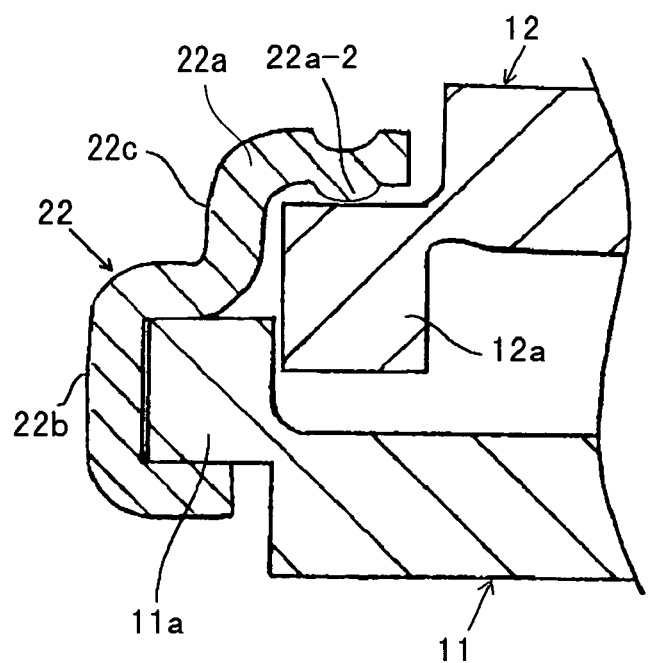
FIG. 6 is a cross-sectional view taken along line VI—VI in FIG. 4, in which the first and second housings are shown.

Further, as shown in FIGS. 1, 2, and 4–6, the annular clip ring 22 comprises an annular guide portion 22a that slidably rotatably supports the peripheral edge 12a of the second housing 12, an annular fixture portion 22b that is fixed to the peripheral edge 11a of the first housing 11 by crimping, and an annular connecting portion or transient portion 22c that interconnects the guide portion 22a and the fixture portion 22b. The guide portion 22a is circumferentially formed with a plurality of (six in this embodiment) elongated proximal projected portions or retainer portions 22a-1 that are projected inwardly (i.e., toward the second housing peripheral edge 12a), so that a sliding clearance between the second housing peripheral edge 12a and the clip ring guide portion 22a can normally be easily controlled. As best shown in FIG. 4, the proximal projected portions 22a-1 are spaced at equal intervals. Also, the guide portion 22a is circumferentially formed with a plurality (six in this embodiment) of circular distal projected portions or slide portions 22a-2 that are projected inwardly (i.e., toward the second housing peripheral edge 12a). As best shown in FIG. 4, the distal projected portions 22a-2 are positioned between the proximal projected portions 22a-1 and are spaced at equal intervals. Typically, the proximal and distal projected portions 22a-1 and 22a-2 are simultaneously formed by depressing the guide portion 22a during press forming of the clip ring 22. Preferably, the proximal and distal projected portions 22a-1 and 22a-2 are alternately positioned at equal intervals. Also, the distal projected portions 22a-2 are preferably constructed to be higher than the proximal projected portions 22a-1.

A representative process for manufacturing the seat reclining mechanism 10 will now be simply described. First, the slide pawls 15 and 15A, the biasing spring 21, the operation arm 17 connected to the rotational rod 13, the rotary cam 16, and the active plate 18, are assembled into the first housing 11. On the other hand, the unlocking plate is assembled into the second housing 12. The first and second housings 11 and 12 thus assembled are preferably coupled such that the peripheral edges 11a and 12a telescopically engage each other. Thereafter, the clip ring 22 is disposed on the engaged peripheral edges 11a and 12a of the housings 11 and 12. Finally, the fixture portion 22b of the clip ring 22 is fixed to the peripheral edge 11a of the first housing 11 by crimping such that desired clearances are produced between the second housing peripheral edge 12a and the proximal and distal projected portions 22a-1 and 22a-2 of the clip ring guide portion 22a. It should be noted that the clip ring 22 may preferably be attached to the first and second housings 11 and 12 such that the proximal projected portions 22a-1 are at least partly opposed to the slide pawls 15 and 15A. However, the proximal projected portions 22a-1 can be automatically opposed to the slide pawls 15 and 15A even if the clip ring 22 is randomly attached to the housings 11 and 12 due to the number of the proximal projected portions 22a-1.

According to the seat reclining mechanism 10 thus constructed, the rotational shaft 13 is normally retained in the locking position by means of the biasing force of the biasing spring 21. When the shaft 13 is retained in the locking position, the rotary cam 16 is urged counterclockwise (FIG. 3), so that the cam mechanism of the rotary cam 16 is actuated. That is, the first to third cam surfaces 16c, 16b, and 16d, thereof cooperate with the corresponding cam contacts 15c, 15d and 15f of the slide pawls 15 (and 15A), so as to outwardly push the respective slide pawls 15 (and 15A). As a result, the slide pawls 15 (and 15A) are moved to the outermost position (FIG. 3). When the slide pawls 15 is retained in the outermost position, the convex toothed portions 15b of the pawls 15 (and 15A) engage the concave toothed portions 12c of the second housing 12. That is, when the rotary cam 16 is urged counterclockwise, the pawls 15 (and 15A) are positioned in engaging positions (FIG. 3). In this state, the second housing 12 is prevented from rotating relative to the first housing 11, thereby locking the seat reclining mechanism 10. As a result, the seat back is locked in position relative to the seat cushion.

The rotational shaft 13 can be rotated clockwise against the urging force of the biasing spring 21 by operating the lever 14. When the rotational shaft 13 is rotated to an unlocking position (not shown), the rotary cam 16 also is rotated clockwise to an unlocking position (not shown), so that the first to third cam surfaces 16c, 16b, and 16d, thereof are disengaged from the cam contacts 15c, 15d, and 15f, of the slide pawls 15 (and 15A). Simultaneously, the active plate 18 also is rotated in the same direction as the rotary cam 16, so that the cam mechanism of the active plate 18 is actuated. As a result, the slide pawls 15 (and 15A) are inwardly moved, so that the convex toothed portions 15b of the pawls 15 (and 15A) are disengaged from the concave toothed portions 12c of the second housing 12. Consequently, the pawls 15 (and 15A) are positioned in non-engaging positions (not shown). In this state, the second housing 12 can freely rotate relative to the first housing 11, thereby unlocking the seat reclining mechanism 10. As a result, the seat back can freely rotate relative to the seat cushion, such that the seat back can be tilted forwardly and rearwardly relative to the seat cushion.

Under an unlocking condition of the seat reclining mechanism 10, when the seat back is tilted forwardly or folded relative to the seat cushion, the second housing 12 and the unlocking plate 19 are rotated counterclockwise in FIG. 3, so that the cam surface of the mid section 19c-2 of the unlocking plate 19 sequentially engages the cam projections 15e' and 15g of the slide pawl 15A. As will be recognized, when the cam surface of the mid section 19c-2 is engaged with either one of the cam projections 15e' and 15g, the slide pawl 15A can be effectively retained in the non-engaging position even if the lever 14 is released. Therefore, the seat back can be tilted forwardly, with the lever 14 released. When the seat back is further tilted over a desired angle (e.g., when the seat back is folded on the seat cushion), the cam surface of the mid section 19c-2 of the plate 19 is disengaged from both of the cam projections 15e' and 15g of the slide pawl 15A, so that the cam projections 15e' and 15g fall within the second wide section 19c-3 of the cam slot 19c. As a result, the rotary cam 16 is immediately rotated counterclockwise to the locking position, so that the slide pawls 15 (15A) are outwardly moved toward the engaging positions. Consequently, the convex toothed portions 15b of the pawls 15 (and 15A) are engaged with the concave toothed portions 12c of the second housing 12, so that the seat reclining mechanism 10 is preferably locked.

Next, the function of the clip ring 22 of the seat reclining mechanism 10 will now be described in detail.

A large force can be unexpectedly applied to the seat reclining mechanism 10, possibly resulting in an outward component force. Such an outward component force may act on the first and second housings 11 and 12 via the slide pawls 15 and 15A. The component force may act on the proximal and distal projected portions 22a-1 and 22a-2 of the guide portion 22a of the clip ring 22 and may work to deform outwardly or spread out the clip ring guide portion 22a. However, the clip ring guide portion 22a can be effectively inhibited from outwardly deforming, because the proximal projected portions 22a-1 preferably increase geometrical moment of inertia or flexural rigidity of the clip ring 22 against the outward component force that acts on the clip ring 22, thereby providing the proximal projected portions 22a-1 with excellent rigidity or deformation resistance. As a result, a desired locking performance of the seat reclining mechanism 10 can be reliably maintained even if the seat reclining mechanism 10 experiences a large force.

SECOND DETAILED REPRESENTATIVE EMBODIMENT

Figure 7:
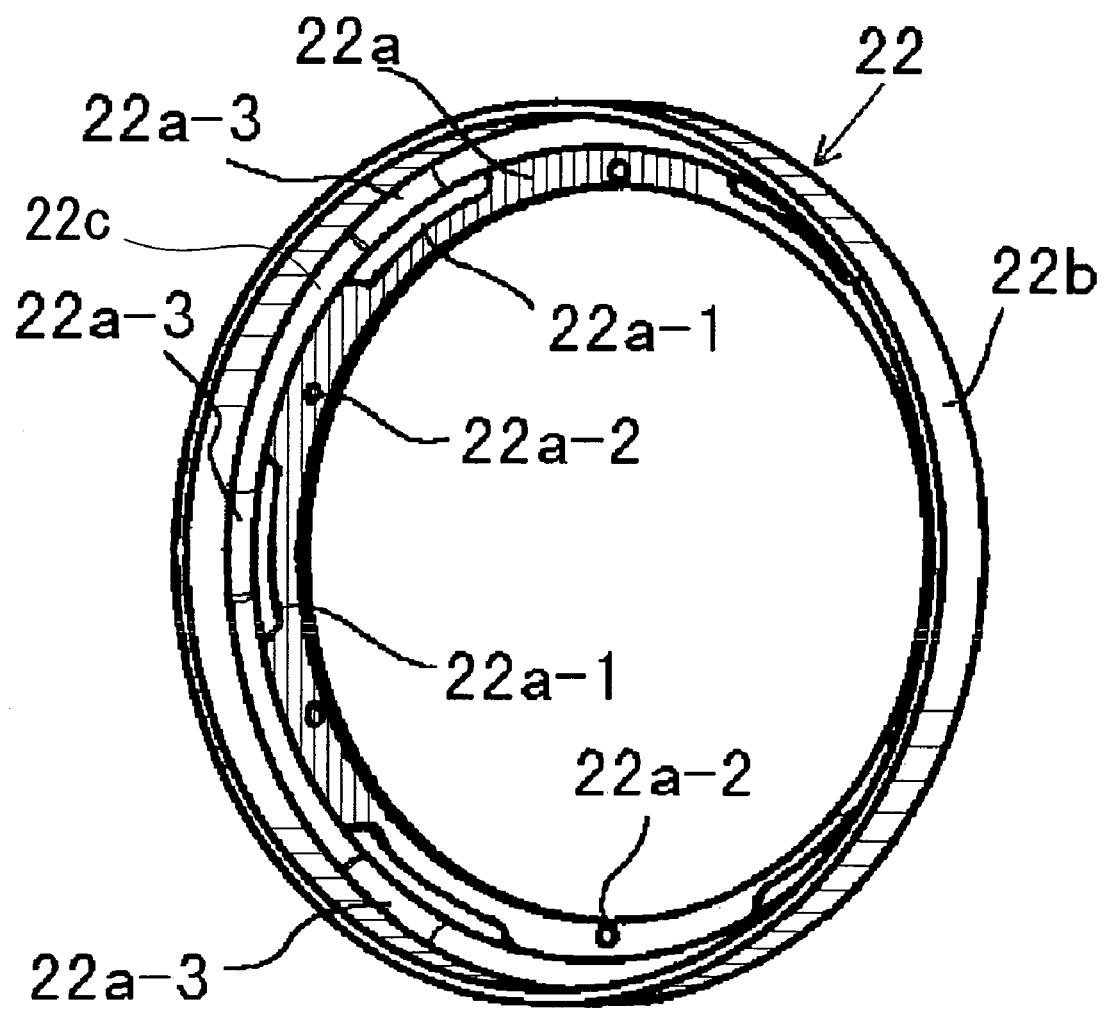
FIG. 7 is a perspective view of a clip ring of a seat reclining mechanism according to a second embodiment of the present teachings.
Figure 8:
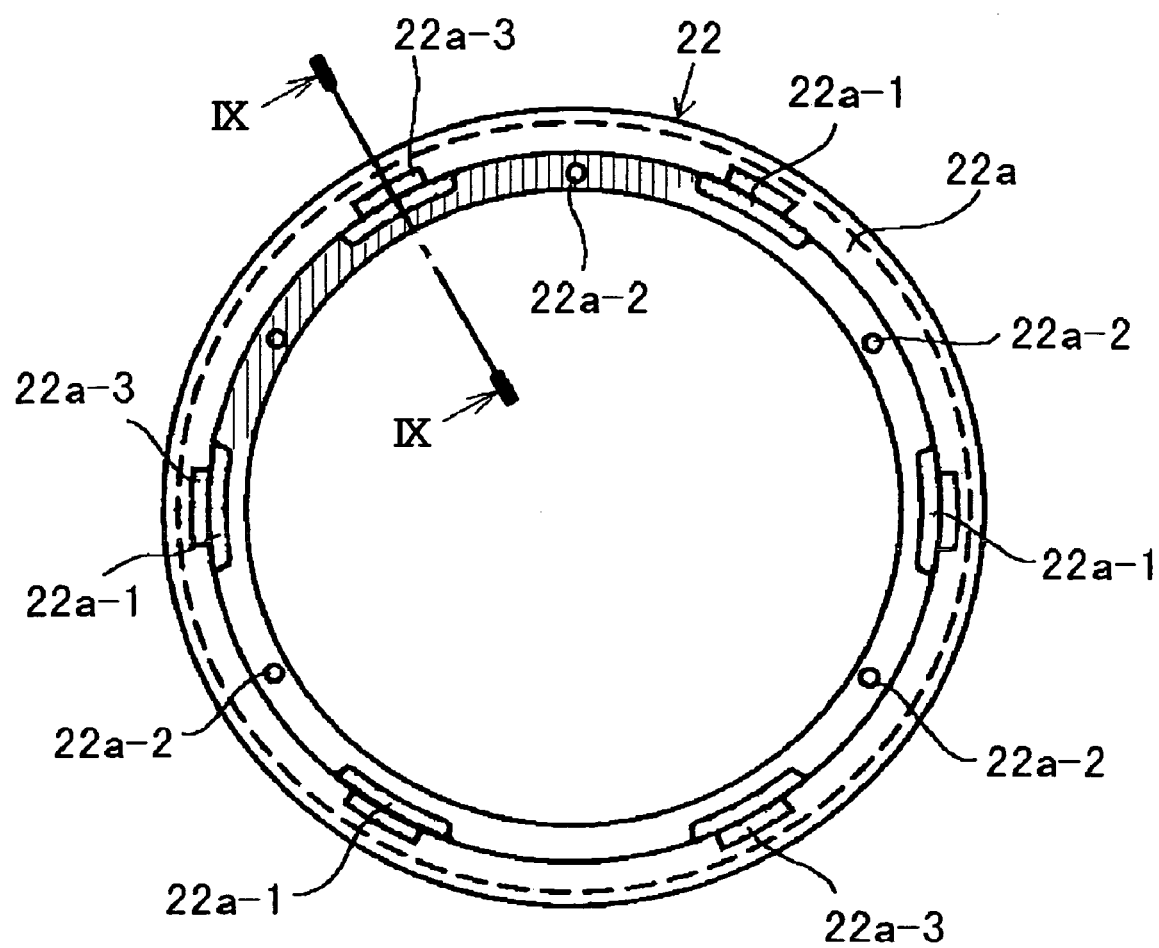
FIG. 8 is a plan view of the clip ring, in which first and second housings are omitted.
Figure 9:
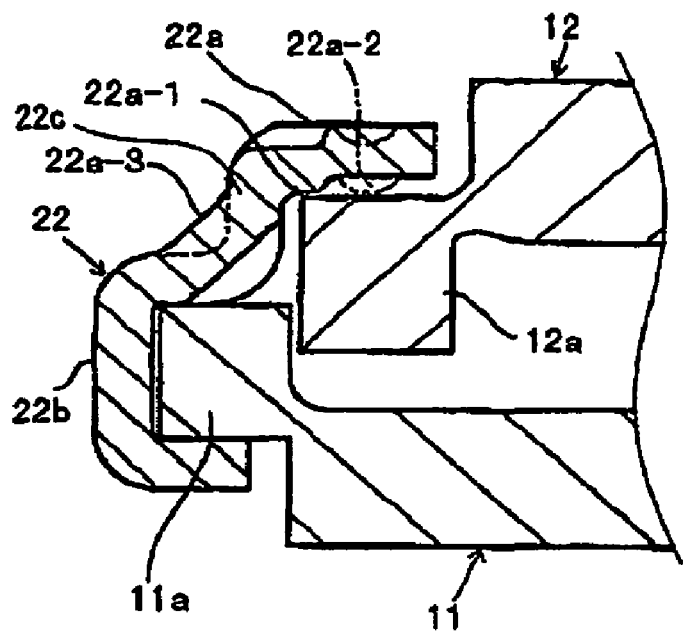
FIG. 9 is a cross-sectional view taken along line IX—IX in FIG. 8, in which first and second housings are shown.
Figure 10:
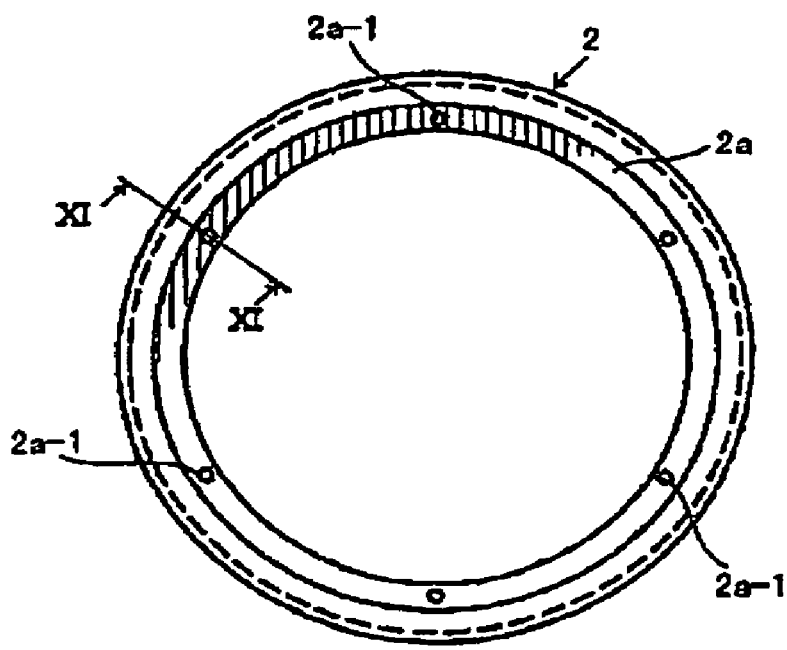
FIG. 10 is a plan view of a conventional clip ring.
Figure 11:
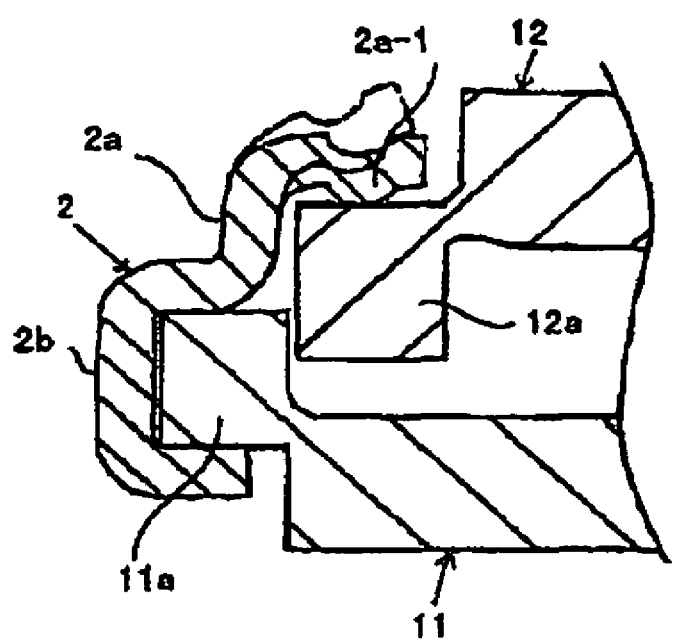
FIG. 11 is a cross-sectional view taken along line XI—XI in FIG. 10, in which first and second housings are shown.

The second detailed representative embodiment will now be described with reference to FIGS. 7–9. Because the second embodiment relates to the first embodiment, only constructions and elements that are different from the first embodiment will be explained in detail. Elements that are the same in the first and second embodiments will be identified by the same reference numerals and detailed descriptions of such elements will be omitted.

In this embodiment, the clip ring 22 is circumferentially formed with a plurality (six in this embodiment) of elongated outwardly deformed portions or beads 22a-3, which are formed in the transient portion 22c interconnecting the guide portion 22a and the fixture portion 22b. As will be apparent, the beads 22a-3 are respectively radially aligned with the proximal projected portions 22a-1. The beads 22a-3 thus constructed may effectively contribute to increase the rigidity or deformation resistance of the proximal projected portions 22a-1, because the beads 22a-3 cooperate with the proximal projected portions 22a-1 to further increase the geometrical moment of inertia or the flexural rigidity of the clip ring 22 against the outward component force that acts on the clip ring 22. Therefore, the clip ring guide portion 22a can be further effectively inhibited from outwardly deforming. As a result, a desired locking performance of the seat reclining mechanism 10 can be more reliably maintained even if the seat reclining mechanism 10 suffers from a large force.

Although the six elongated proximal projected portions 22a-1 are exemplified in these representative embodiments, the number, shape, and arrangement, of the proximal projected portions 22a-1 can be changed provided that the proximal projected portions 22a-1 can be at least partly opposed to the slide pawls 15 and 15A, if necessary.

Moreover, the construction of the clip ring 22 also can be applied to other similar seat reclining mechanisms, for example, a continuously variable seat reclining mechanism having a locking means that is different from the locking means used in these embodiments.

The invention claimed is:

1. A seat reclining mechanism for a vehicle seat comprising:
   a first housing;
   a second housing;
   a locking means received between the first and second housings; and
   a fastener for rotatably connecting the second housing to the first housing;
   wherein the fastener is formed with at least one arcuate retainer portion and at least one slide portion that respectively project toward the second housing, and wherein the at least one retainer portion is arranged and constructed to increase flexural rigidity of the fastener;
   wherein the fastener comprises a fixture portion fixed to a peripheral edge of the first housing and a guide portion rotatably supporting a peripheral edge of the second housing, and wherein the at least one retainer portion is proximally formed in the guide portion, and
   wherein the fastener comprises a transient portion interconnecting the fixture portion and the guide portion, and wherein the transient portion is formed with at least one outwardly deformed portion.

2. A seat reclining mechanism as defined in claim 1, wherein the at least one outwardly deformed portion is radially aligned with the at least one retainer portion.

3. A seat reclining mechanism for a vehicle seat, comprising:
   a first housing;
   a second housing;
   a locking means received between the first and second housings; and
   a fastener for rotatably connecting the second housing to the first housing;
   wherein the fastener is formed with a plurality of retainer portions and a plurality of slide portions that respectively project toward the second housing; and
   wherein the retainer portions and the slide portions are alternately positioned at desired intervals along the fastener.

4. A seat reclining mechanism as defined in claim 3, wherein the fastener comprises a fixture portion fixed to a peripheral edge of the first housing and a guide portion rotatably supporting a peripheral edge of the second housing, and wherein the retainer portions are proximally formed in the guide portion.

5. A seat reclining mechanism as defined in claim 4, wherein the retainer portions are formed by depressing the guide portion.

* * * * *

UNITED STATES PATENT AND TRADEMARK OFFICE
CERTIFICATE OF CORRECTION

PATENT NO. : 7,100,986 B2
APPLICATION NO. : 10/730693
DATED : September 5, 2006
INVENTOR(S) : Hideki Uramichi and Takayuki Endo It is certified that error appears in the above-identified patent and that said Letters Patent is hereby corrected as shown below:

On the title page, item (73) Assignee:

Delete "Arakawa Shatai Kogyo Kabushiki Kaisha" and insert --Toyota Boshoku Kabushiki Kaisha--

Signed and Sealed this
Sixth Day of November, 2012

David J. Kappos
*Director of the United States Patent and Trademark Office*